United States Patent
Lulich et al.

(10) Patent No.: US 6,938,025 B1
(45) Date of Patent: Aug. 30, 2005

(54) METHOD AND APPARATUS FOR AUTOMATICALLY DETERMINING SALIENT FEATURES FOR OBJECT CLASSIFICATION

(75) Inventors: Daniel P. Lulich, Portland, OR (US); Farzin G. Guilak, Beaverton, OR (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 09/963,170

(22) Filed: Sep. 25, 2001

Related U.S. Application Data

(60) Provisional application No. 60/289,400, filed on May 7, 2001.

(51) Int. Cl.[7] .................................................. G06N 5/02
(52) U.S. Cl. .......................................... 706/45; 707/1
(58) Field of Search .......................... 706/45; 382/190; 707/1, 6

(56) References Cited

U.S. PATENT DOCUMENTS

| | | | |
|---|---|---|---|
| 5,461,698 A | 10/1995 | Schwanke et al. | |
| 5,640,468 A | * 6/1997 | Hsu | 382/190 |
| 5,652,829 A | 7/1997 | Hong | |
| 5,657,424 A | 8/1997 | Farrell et al. | |
| 5,706,507 A | 1/1998 | Schloss | |
| 5,809,499 A | * 9/1998 | Wong et al. | 707/6 |
| 5,835,905 A | 11/1998 | Pirolli et al. | |
| 5,867,799 A | * 2/1999 | Lang et al. | 707/1 |
| 5,870,744 A | 2/1999 | Sprague | |
| 5,911,043 A | 6/1999 | Duffy et al. | |
| 6,058,205 A | 5/2000 | Bahl et al. | |
| 6,128,613 A | 10/2000 | Wong et al. | |
| 6,161,130 A | 12/2000 | Horvitz et al. | |
| 6,163,778 A | 12/2000 | Fogg et al. | |
| 6,233,575 B1 | * 5/2001 | Agrawal et al. | 707/6 |
| 6,249,785 B1 | 6/2001 | Paepke | |
| 6,252,988 B1 | 6/2001 | Ho | |
| 6,285,999 B1 | 9/2001 | Page | |
| 6,430,558 B1 | 8/2002 | Delano | |
| 6,473,753 B1 | 10/2002 | Katariya et al. | |
| 6,507,843 B1 | 1/2003 | Dong | |
| 6,519,580 B1 | 2/2003 | Johnson et al. | |
| 6,604,114 B1 | 8/2003 | Toong et al. | |
| 2001/0032029 A1 | 10/2001 | Kauffman | |
| 2001/0042085 A1 | 11/2001 | Peairs et al. | |
| 2002/0099730 A1 | 7/2002 | Brown et al. | |
| 2002/0152222 A1 | 10/2002 | Holbrook | |

FOREIGN PATENT DOCUMENTS

WO    WO 01/33413 A1    5/2001

* cited by examiner

*Primary Examiner*—Wilbert L. Starks, Jr.
(74) *Attorney, Agent, or Firm*—Senniger Powers

(57) ABSTRACT

A method and apparatus for automatically determining salient features for object classification is provided. In accordance with one embodiment, one or more unique features are extracted from a first content group of objects to form a first feature list, and one or more unique features are extracted from a second anti-content group of objects to form a second feature list. A ranked list of features is then created by applying statistical differentiation between unique features of the first feature list and unique features of the second feature list. A set of salient features is then identified from the resulting ranked list of features.

31 Claims, 7 Drawing Sheets

METHOD AND APPARATUS FOR AUTOMATICALLY DETERMINING SALIENT FEATURES FOR OBJECT CLASSIFICATION

RELATED APPLICATIONS

This application is a non-provisional application of the earlier filed provisional application No. 60/289,400, filed on May 7, 2001, and claims priority to the earlier filed '400 provisional application, whose specification is hereby fully incorporated by reference.

BACKGROUND OF THE INVENTION

1. Field of the Invention

The invention relates to the field of data processing. More specifically, the invention relates to the automatic selection of features of objects for use in classifying the objects into groups.

2. Background Information

The World Wide Web provides an important information resource, with estimates of billions of pages of information available for online viewing and downloading. In order to make efficient use of this information, however, a sensible method for navigating this huge expanse of data is necessary.

In the early days of Internet surfing, two basic methods were developed for assisting in Web searches. In the first approach, an indexed database is created based upon the contents of Web pages gathered by automated search engines which "crawl" the web looking for new and unique pages. This database can then be searched using various query techniques, and often ranked on the basis of similarity to the form of the query. In the second approach, Web pages are grouped into a categorical hierarchy, typically presented in a tree form. The user then makes a series of selections while descending the hierarchy, with two or more choices at each level representing salient differences between the sub trees below the decision point, ultimately reaching leaf nodes which contain pages of text and/or multimedia content.

For example, FIG. 1 illustrates an exemplary prior art subject hierarchy 102 in which multiple decision nodes (hereinafter "nodes") 130–136 are hierarchically arranged into multiple parent and/or child nodes, each of which are associated with a unique subject category. For example, node 130 is a parent node to nodes 131 and 132, while nodes 131 and 132 are child nodes to node 130. Because nodes 131 and 132 are both child nodes of the same node (e.g. node 130), nodes 131 and 132 are said to be siblings of one another. Additional sibling pairs in subject hierarchy 102 include nodes 133 and 134, as well as nodes 135 and 136. It can be seen from FIG. 1 that node 130 forms a first level 137 of subject hierarchy 102, while nodes 131–132 form a second level 138 of subject hierarchy 102, and nodes 133–136 form a third level 139 of subject hierarchy 102. Additionally, node 130 is referred to as a root node of subject hierarchy 102 in that it is not a child of any other node.

The process of creating a hierarchical categorization for Web pages presents multiple challenges. First, the nature of the hierarchy must be defined. This is typically done manually by experts within a particular subject area, in a manner similar to the creating of categories in the Dewey Decimal System for libraries. These categories are then provided with descriptive labels so that users and categorizers can make appropriate decisions while navigating the hierarchy. Content in the form of individual electronic documents for example are then placed into the categories by means of a manual search through the hierarchy.

In recent years attention has been directed towards automating the various stages of this process. Systems exist for the automatic categorization of documents from a corpus of documents. For example, some systems utilize key words associated with documents to automatically cluster or group similar documents. Such clusters can be iteratively grouped into super-clusters, thus creating a hierarchical structure, however, these systems require manual insertion of key words, and produce a hierarchy with no systematic structure. If the hierarchy is to be used for manual search, labels must be affixed to the nodes of the hierarchy by manual examination of the sub nodes or leaf documents to identify common feature(s).

Many classification systems utilize lists of salient words for classifying documents. Typically, salient words are either predefined or selected from the documents being processed to more accurately characterize the documents. Commonly these salient word lists are created by counting the frequency of occurrence of all words for each of a set of documents. Words are then removed from the word lists according to one or more criteria. Often, words that occur too few times within the corpus are eliminated, since such words are too rare to reliably distinguish among categories, whereas words that occur too frequently are eliminated, because such words are assumed to occur commonly in all documents across categories.

Further, "stop words" and word stems are often eliminated from feature lists to facilitate salient feature determination. Stop words comprise words which are common in the language such as "a", "the", "his", and "and", which are felt to carry no semantic content, whereas word stems represent suffixes such as "-ing", "-end", "-is", and "-able". Unfortunately, the creation of stop word and word stem lists is a language-specific task, requiring expert knowledge of syntax, grammar, and usage, which may change with time. Thus, a more flexible way of determining salient features is therefore desirable.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
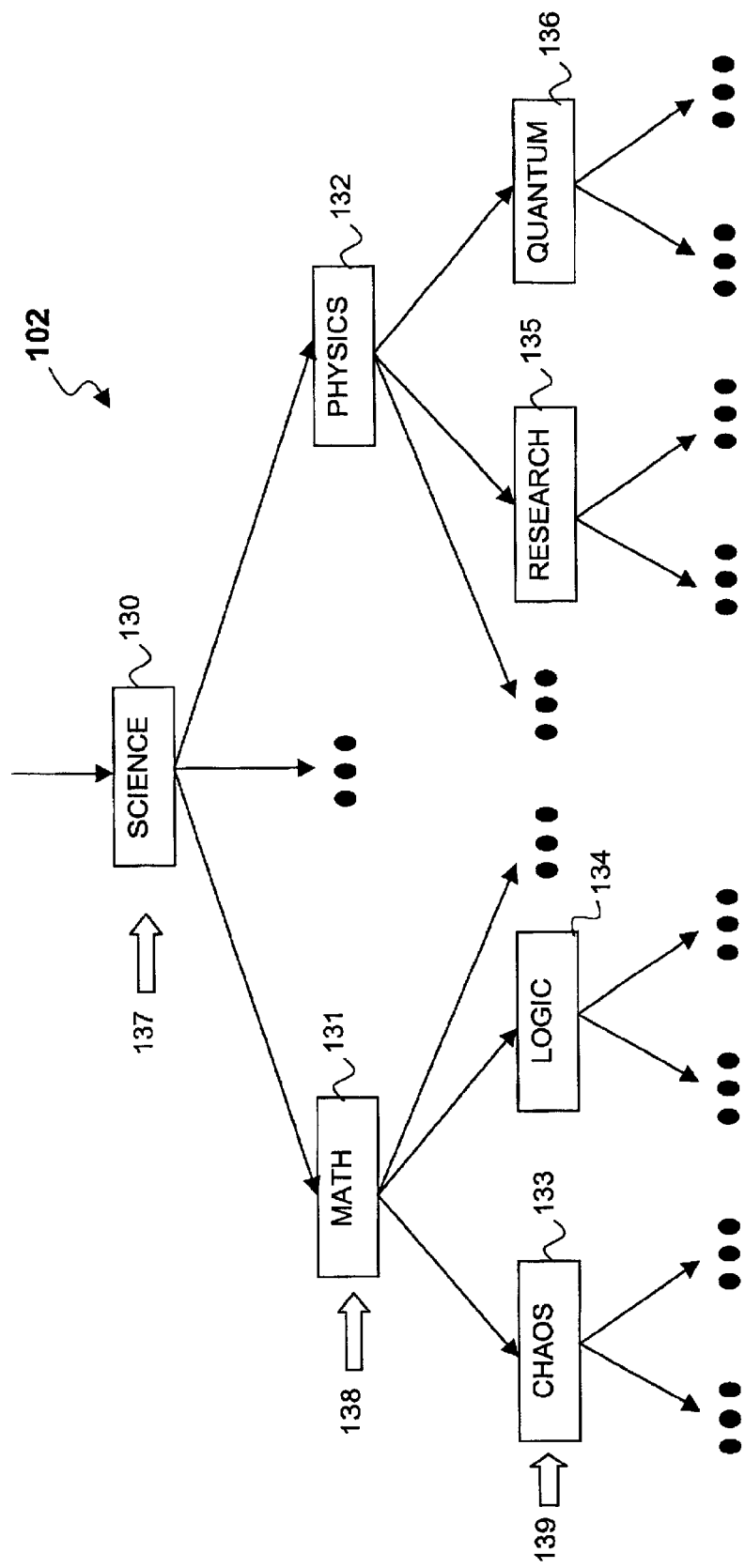
FIG. 1 illustrates an exemplary prior art subject hierarchy including multiple decision nodes.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, storing, selecting, determining, calculating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

In accordance with one embodiment of the invention, one or more unique features are extracted from a first group of objects to form a first feature set, and one or more unique features are extracted from a second group of objects to form a second feature set. A ranked list of features is then created by applying statistical differentiation between unique features of the first feature set and unique features of the second feature set. A set of salient features is then identified from the resulting ranked list of features.

In one embodiment, salient features are determined to facilitate efficient classification and categorization of data objects including but not limited to text files, image files, audio sequences and video sequences comprising both proprietary and non-proprietary formats within very-large-scale hierarchical classification trees as well as within non-hierarchical data structures such as flat files. In a text file for example, features may take the form of words where the term "word" is commonly understood to represent a group of letters within a given language, having some semantic meaning. More generally, a feature could be an N-token gram, where a token is one atomic element of a language including N-letter grams and N-word grams in English, as well as N-ideogram grams in Asian languages for example. In audio sequences, for example, musical notes, intonation, tempo, duration, pitch, volume and the like may be utilized as features for classifying the audio, whereas in video sequences and still images, various pixel attributes such as chrominance and luminance levels may be utilized as features. In accordance with one embodiment of the present invention, once a group of features have been identified from a group of e.g. electronic documents, a subset of those features are then determined to be salient for the purposes of classifying a given group of data objects. The term "electronic document" is broadly used herein to describe a family of data objects such as those described above that include one or more constituent features. Although an electronic document may include text, it may similarly include audio and/or video content in place of, or in addition to text.

Once feature selection criteria have been determined (i.e. which of the various text/audio/video attributes will be utilized as determinative features within the set of data objects), the salient feature determination process of the present invention may be performed. To begin the salient feature determination process, the data objects in question are divided into two groups. An equation representing the "odds of relevance" is then applied to these groups of data objects (see e.g. equation 1), where O(d) represents the odds that a given data object is a member of a first group of data objects, P(R|d) represents the probability that the data object is a member of the first group, and P(R'|d) represents that probability that the data object is a member of the second group.

$$O(d) = \frac{P(R|d)}{P(R'|d)} \qquad \text{equation (1)}$$

Because manual grouping of the data objects does not provide the probability desired to compute the odds of relevance, equation (1) can be maximized to approximate this value. Accordingly, the logarithm function in conjunction with Baye's formula can be applied to both sides of equation (1), to yield equation (2):

$$\log O(d) = \log P(d|R) - \log P(d|R') + \log P(R) - \log P(R'). \qquad \text{equation (2)}$$

If a data object is assumed to consist of a set of features $\{F_i\}$, and $X_i$ is either 1 or 0 if a given feature $f_i$ is present or absent in a data object, respectively, then:

$$\log O(d) = \qquad \text{equation (3)}$$
$$\sum_i [\log P(X_i|R) - \log P(X_i|R')] + \log P(R) - \log P(R').$$

Since log P(R) and log P(R') are constant and independent of the features selected as salient in the data object, a new quantity g(d) is defined such that:

$$g(d) = \sum_i [\log P(X_i|R) - \log P(X_i|R')]. \qquad \text{equation (4)}$$

If it is assumed that $p_i = P(X_i=1|R)$ represents the probability that the given feature ($f_i$) occurs in a data object in the first group of data objects, and $q_i = P(X_i=1|R')$ represents the probability that the given feature ($f_i$) occurs in a data object in the second group of data objects, then substitution and simplification yields equation (5):

$$g(d) = \sum_i \left[ X_i \log \frac{p_i(1-q_i)}{q_i(1-p_i)} \right] + \sum_i \left[ \log \frac{1-p_i}{1-q_i} \right]. \qquad \text{equation (5)}$$

Because the second summation does not depend upon the feature occurrences in the data objects, it can be eliminated resulting in equation (6):

$$\log \frac{p_i(1-q_i)}{q_i(1-p_i)}. \qquad \text{equation (6)}$$

Because the log function is monotonic, maximizing the ratio of:

$$\frac{p_i(1-q_i)}{q_i(1-p_i)} \quad \text{equation (7)}$$

is sufficient to maximize the corresponding log value. In accordance with one embodiment of the invention, equation (7) is applied to each feature in the combined feature list for the two groups of data objects in order to facilitate identification of salient features. In order to do so, $p_i$ is estimated to represent the number of data objects in the first group of data objects that contain feature $f_i$ at least once, divided by the total number of data objects in the first group of data objects documents. Likewise, $q_i$ is estimated to represent the number of data objects in the second group that contain feature $f_i$ at least once, divided by the total number of data objects in the second group of data objects.

Figure 2A:
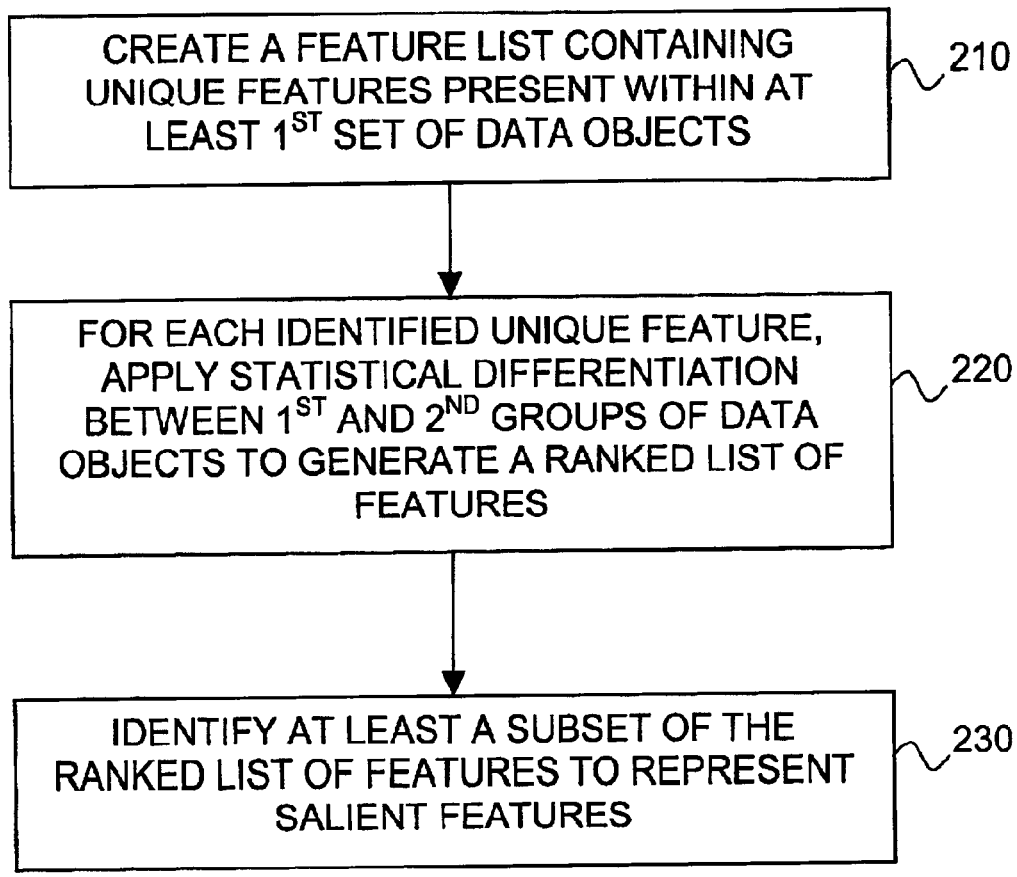
FIGS. 2(A–C) illustrate an operational flow of a salient feature determination function, in accordance with one embodiment of the invention.
Figure 2B:
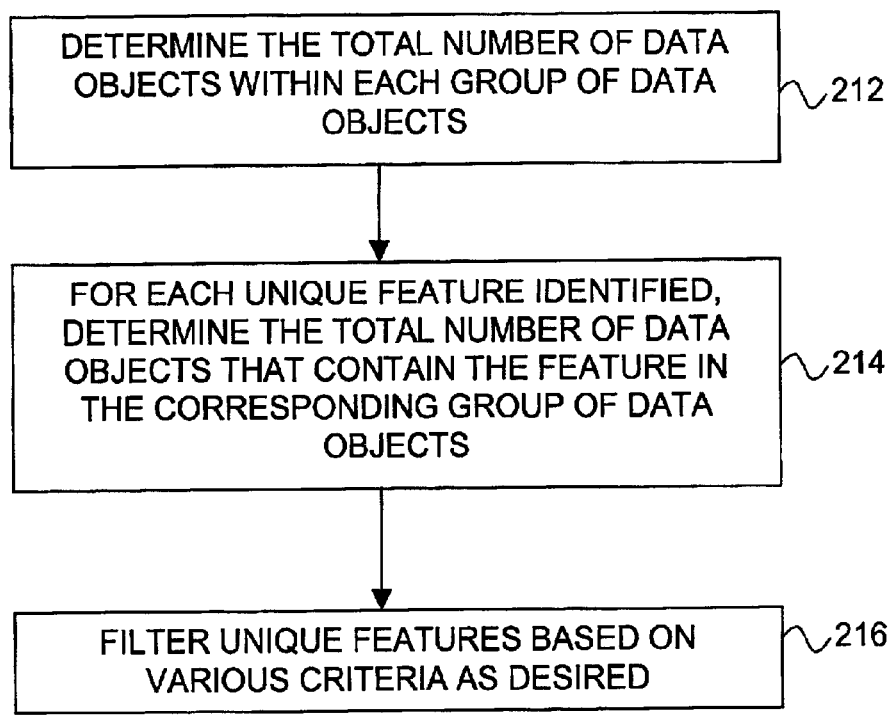

FIGS. 2(A–C) illustrate an operational flow of a salient feature determination function, in accordance with one embodiment of the invention. To begin, a first set of data objects are examined to create a feature list consisting of unique features present within one or more data objects from at least the first set of data objects, block 210. For each unique feature identified, equation (7) is applied to generate a ranked list of features, block 220, and at least a subset of the ranked list of features are chosen as salient features, block 230. The salient features may comprise one or more contiguous or non-contiguous group(s) of elements selected from the ranked list of features. In one embodiment, the first N elements of the ranked list of features are chosen as salient, where N may vary depending upon the requirements of the system. In an alternative embodiment, the last M elements of the ranked list of features are chosen as salient, where M may also vary depending upon the requirements of the system.

In accordance with one embodiment of the invention, while creating the feature list, block 210, the total number of data objects contained within each group of data objects is determined, block 212, and for each unique feature identified within at least the first group of data objects, the total number of data objects containing the unique feature is also determined, block 214. Additionally, the list of unique features may be filtered based upon various criteria as desired, block 216. For example, the list of unique features may be pruned to remove those features that are not found in at least some minimum number of data objects, those features that are shorter than some established minimum length, and/or those features that occur a fewer number of times than an allotted amount.

Figure 2C:
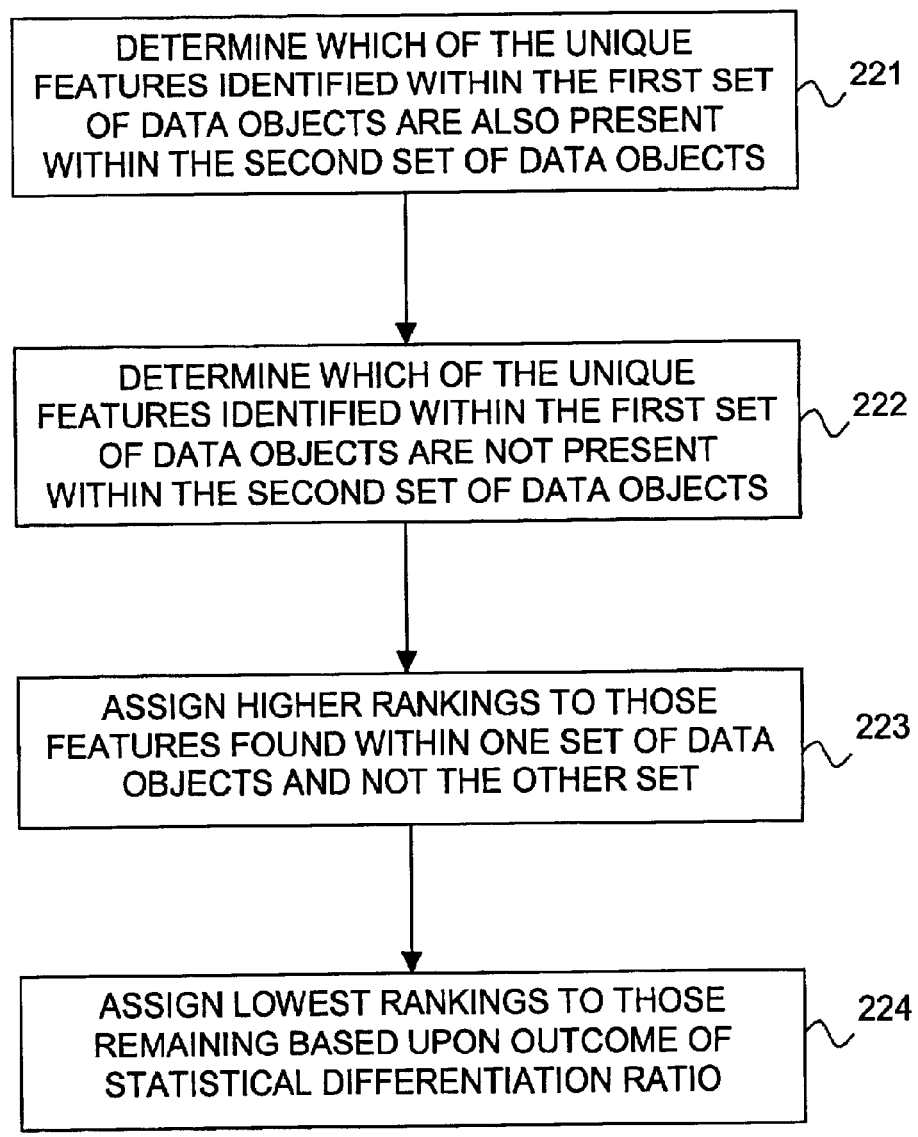

In accordance with one embodiment of the invention, applying statistical differentiation to obtain a ranked list of features, as described with respect to block 220 of FIG. 2A, further includes those processes illustrated in FIG. 2C. That is to say, in applying statistical differentiation (i.e. as represented by equation (7)), a determination is made as to which of the unique features identified within the first set of data objects are also present within the second set of data objects, block 221, as well as a determination as to which of the unique features identified within the first set of data objects are not present within the second set of documents, block 222. In accordance with the illustrated embodiment, those features that are determined to be present in one set of data objects but not the other set are assigned a higher relative ranking within the ranked list of features, block 223, whereas those features that are determined to be present in both sets of data objects are assigned a lower relative ranking, as determined through statistical differentiation (i.e. equation (7)), block 224. Optionally, the features may further be ranked within the ranked feature list based upon the total number of data objects that contain each respective feature.

EXAMPLE APPLICATION

Figure 3:
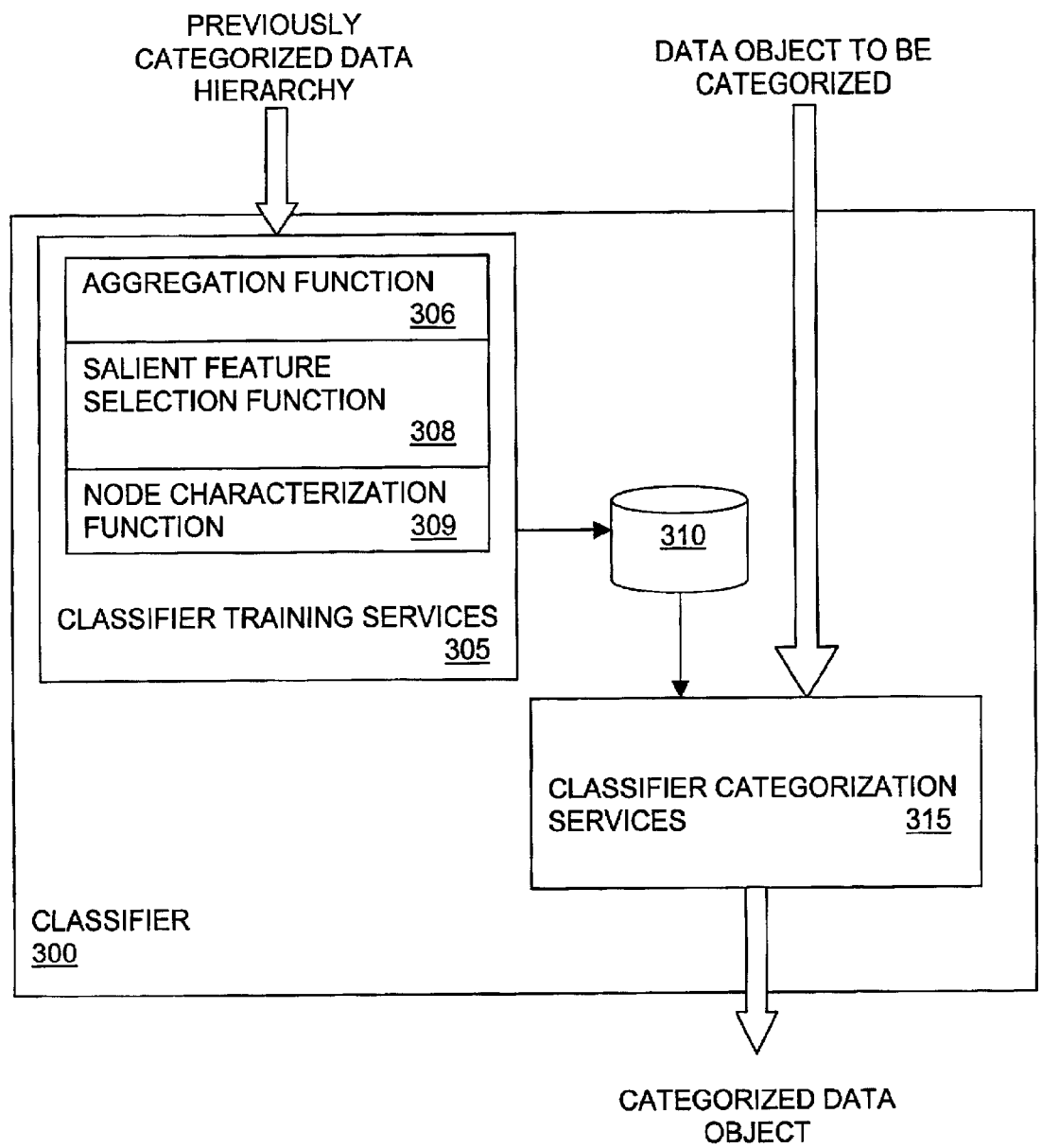
FIG. 3 illustrates an example application of the salient feature determination facilities of the present invention, in accordance with one embodiment.

Reference is now made to FIG. 3, wherein a diagram illustrating an example application of the salient feature determination facilities of the present invention, in accordance with one embodiment, is shown. As illustrated, classifier 300 is provided to efficiently classify and categorize data objects such as electronic documents including but not limited to text files, image files, audio sequences and video sequences comprising both proprietary and non-proprietary formats, within a variety of data structures including very-large-scale hierarchical classification trees and flat file formats. Classifier 300 includes classifier training services 305, for training classifier 300 to categorize the new data objects based upon classification rules extracted from a previously categorized data hierarchy, as well as classifier categorization services 315 for categorizing new data objects input into classifier 300.

Classifier training services 305 include aggregation function 306, salient feature determination function 308 of the present invention, and node characterization function 309. In accordance with the illustrated embodiment, content from the previously categorized data hierarchy is aggregated at each node in the hierarchy, through aggregation function 306 for example, to form both content and anti-content groups of data. Features from each of these groups of data are then extracted and a subset of those features are determined to be salient by way of salient feature determination function 308. Node characterization function 309 is utilized to characterize each node of the previously categorized data hierarchy based upon the salient features, and to store such hierarchical characterizations in data store 310 for example, for further use by classifier categorization services 315.

Additional information regarding classifier 300 including classifier training services 305 and classifier categorization services 315 are described in co-pending, U.S. patent application No. <<51026.P004>> entitled "Very-Large-Scale Automatic Categorizer For Web Content" filed contemporaneously herewith, and commonly assigned to the assignee of the present application, the disclosure of which is fully incorporated herein by reference.

Classifier Training Services

Figure 4:
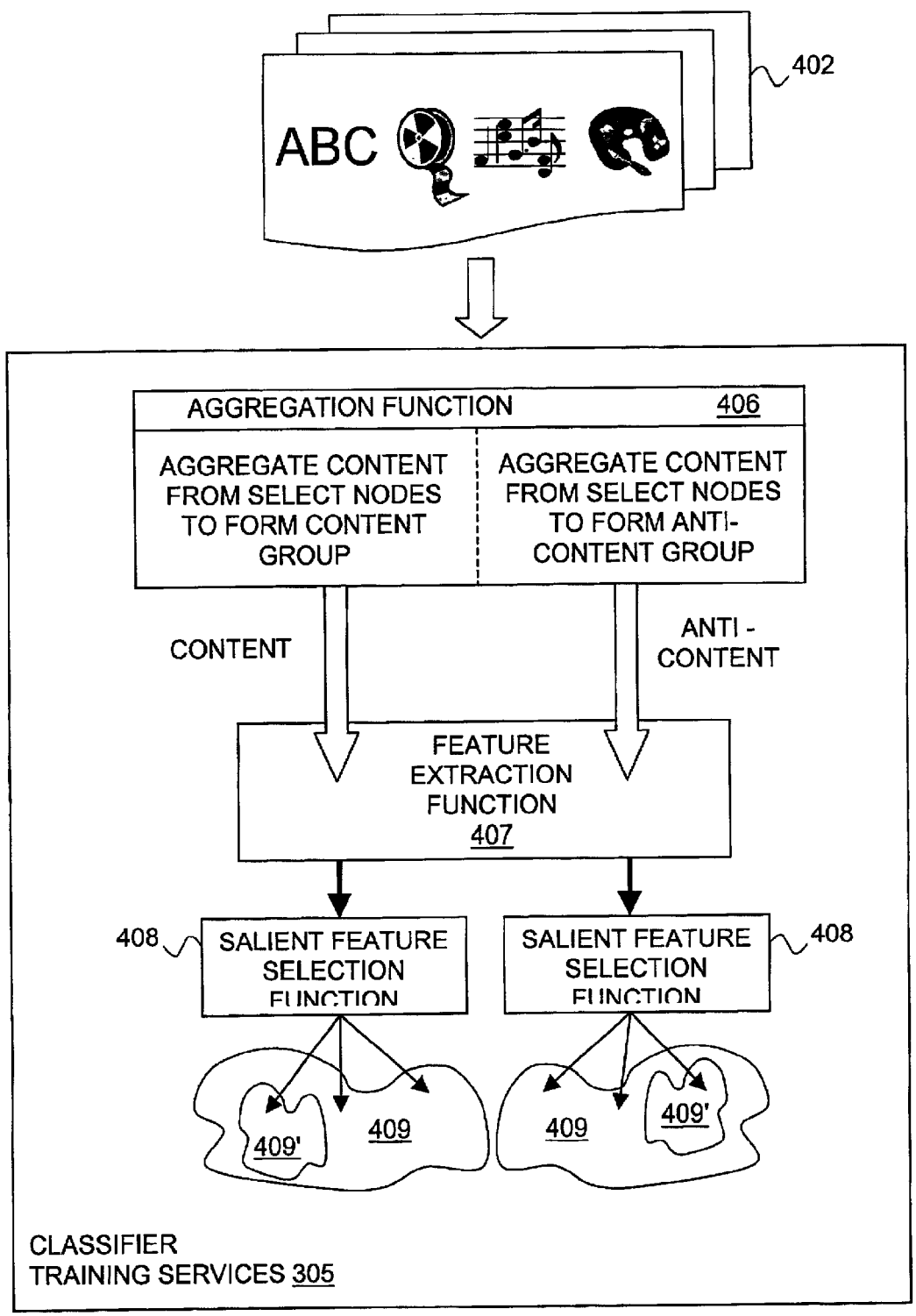
FIG. 4 illustrates a functional block diagram of classifier training services of FIG. 3, in accordance with one embodiment of the invention.

FIG. 4 illustrates a functional block diagram of classifier training services 305 of FIG. 3, in accordance with one embodiment of the invention. As illustrated in FIG. 4, previously categorized data hierarchy 402 is provided for input into classifier training services 305 of classifier 300. Previously categorized data hierarchy 402 represents a set of data objects such as audio, video and/or text objects, which have been previously classified and categorized into a subject hierarchy (typically through manual entry by individuals). Previously categorized data hierarchy 402 may represent one or more sets of electronic documents previously categorized by a Web portal or search engine for example.

In accordance with the illustrated example, aggregation function 406 aggregates content from previously categorized data hierarchy 402 into content and anti-content data groups so as to increase differentiation between sibling nodes at each level of the hierarchy. Salient feature determination function 408 operates to extract features from the content and anti-content groups of data and determine which of the extracted features (409) are to be considered salient (409').

Additionally, in accordance with the illustrated example, node characterization function 309 of FIG. 3 operates to characterize the content and anti-content groups of data. In one embodiment, the content and anti-content groups of data are characterized based upon the determined salient features. In one embodiment, the characterizations are stored in data store 310, which can be implemented in the form of any number of data structures such as a database, a directory structure, or a simple lookup table. In one embodiment of the invention, the parameters for the classifiers for each node are stored in a hierarchical categorization tree having a file structure that mimics the previously categorized data hierarchy.

EXAMPLE COMPUTER SYSTEM

Figure 5:
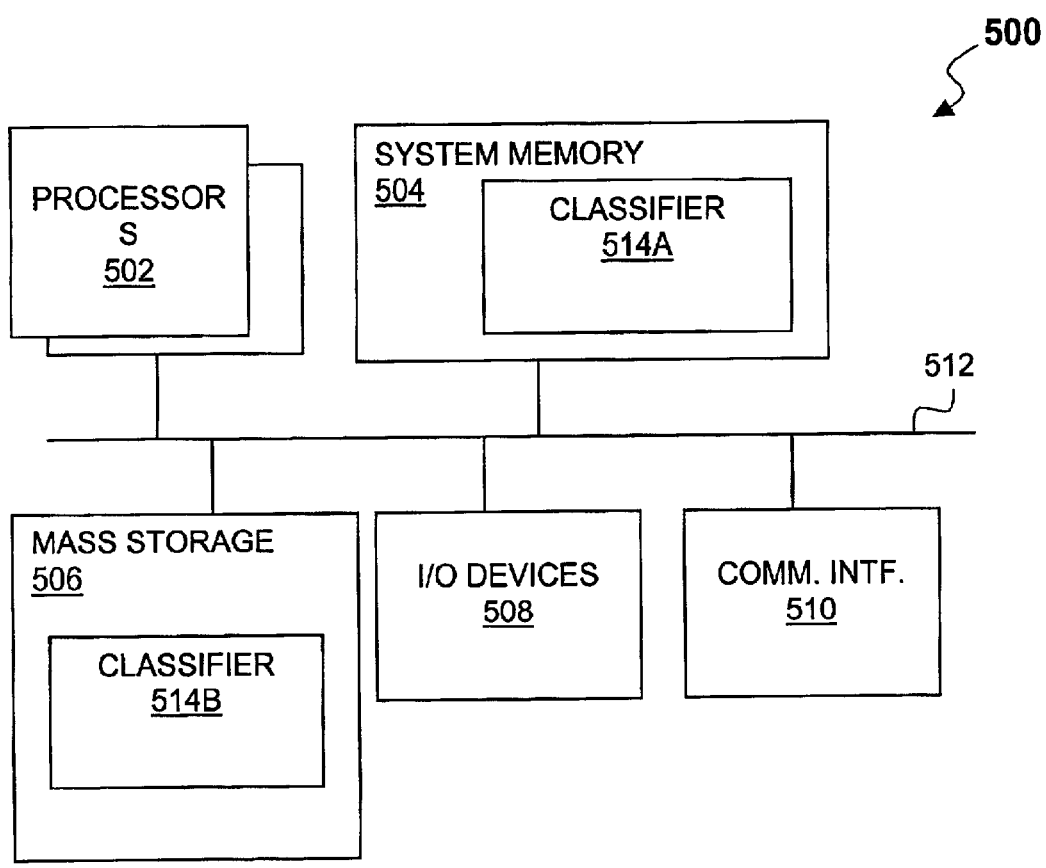
FIG. 5 illustrates an example computer system suitable for use in determining salient features, in accordance with one embodiment of the present invention.

FIG. 5 illustrates an example computer system suitable for use in determining salient features, in accordance with one embodiment of the present invention. As shown, computer system 500 includes one or more processors 502 and system memory 504. Additionally, computer system 500 includes mass storage devices 506 (such as diskette, hard drive, CDROM and so forth), input/output devices 508 (such as keyboard, cursor control and so forth) and communication interfaces 510 (such as network interface cards, modems and so forth). The elements are coupled to each other via system bus 512, which represents one or more buses. In the case where system bus 512 represents multiple buses, they are bridged by one or more bus bridges (not shown).

Each of these elements performs its conventional functions known in the art. In particular, system memory 504 and mass storage 506 are employed to store a working copy and a permanent copy of the programming instructions implementing the categorization system of the present invention. The permanent copy of the programming instructions may be loaded into mass storage 506 in the factory, or in the field, as described earlier, through a distribution medium (not shown) or through communication interface 510 (from a distribution server (not shown). The constitution of these elements 502–512 are known, and accordingly will not be further described.

Conclusion and Epilogue

Thus, it can be seen from the above descriptions, a novel method and apparatus for automatically determining salient features for object classification has been described. While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method for classifying one or more electronic documents, said method comprising:

extracting one or more unique features from a first content group of data objects representing a first group of electronic documents to form a first feature list;

extracting one or more unique features from a second anti-content group of data objects representing a second group of electronic documents to form a second feature list;

identifying those unique features of said first feature list that are not present in said second feature list;

identifying those unique features of said first feature list that are also present in said second feature list;

creating a ranked list of features by applying statistical differentiation between unique features of said first feature list and unique features of said second feature list, wherein those unique features of said first feature list that are not present in said second feature list are ranked higher within said ranked list as compared to those unique features of said first feature list that are also present in said second feature list;

identifying a set of salient features from said ranked list of features, wherein the set of salient features distinguishes the first group of electronic documents from the second group of electronic documents; and classifying the first group of electronic documents and the second group of electronic documents based on the set of salient features.

2. The method of claim 1, further comprising:

determining a first total number of data objects comprising said first content group of data objects; and determining a second total number of data objects comprising said second anti-content group of data objects.

3. The method of claim 2, further comprising:

determining, for each of said one or more unique features forming said first feature list, a first number of data objects of said first content group of data objects that contain at least one instance of each respective said one or more unique features of said first feature list; and determining, for each of said one or more unique features forming said second feature list, a second number of data objects of said second anti-content group of data objects that contain at least one instance of each respective said one or more unique features of said second feature list.

4. The method of claim 3, further comprising:

applying a probabilistic function to each of those unique features of said first feature list that are also present in said second feature list to obtain a result vector, wherein said probabilistic function comprises a ratio of the first number of data objects divided by said first total number of data objects, to said second number of data objects divided by said second total number of data objects; and ordering those unique features of said first feature list that are also present in said second feature list within said ranked list based at least in part upon the result vector of said probabilistic function.

5. The method of claim 3, wherein those unique features of said first feature list that are not present in said second feature list are further ranked based upon the first number of data objects.

6. The method of claim 1, wherein identifying said set of salient features from said ranked list of features comprises selecting a first N contiguous features of said ranked list of features.

7. The method of claim 1, wherein identifying said set of salient features from said ranked list of features comprises selecting a last M contiguous features of said ranked list of features.

8. The method of claim 1, wherein each of said unique features comprises a grouping of one or more alphanumeric characters.

9. The method of claim 1, further comprising:
classifying a new data object as being most related to one of said first content group of data objects and said second anti-content group of data objects based at least in part upon said set of salient features.

10. The method of claim 1, wherein said first content group of data objects comprises those data objects corresponding to a selected node of a subject hierarchy having a plurality of nodes and any associated sub-nodes of the selected node; and
wherein said second anti-content group of data objects comprises those data objects corresponding to any associated sibling nodes of the selected node and any associated sub-nodes of the sibling nodes.

11. A method for classifying one or more electronic documents, the method comprising:
identifying one or more unique features that are members of a first data class, said first data class comprising a first group of electronic documents;
examining a second data class to identify those of said one or more unique features that are also members of said second data class, and those of said one or more unique features that are not members of said second data class, said second data class comprising a second group of electronic documents;
generating a ranked list of unique features having an order based upon membership of each of said one or more unique features within said second data class, wherein those of said unique features that are not members of said second data class are ranked higher in said ranked list than those of said unique features that are also members of said second data class;
identifying as salient one or more of said ranked list of unique features, wherein said one or more of said ranked list of unique features identified as salient distinguish the first group of electronic documents from the second group of electronic documents; and
classifying the first group of electronic documents from the second group of electronic documents based on said one or more of said ranked list of unique features identified as salient.

12. The method of claim 11, further comprising:
determining, for each of said ranked list of unique features, a number of objects within said first data class that contain each respective unique feature.

13. The method of claim 12, wherein generating a ranked list further comprises ranking those of said unique features that belong to a greater number of objects of said first data class higher in said ranked list than those of said unique features that belong to a lesser number of objects within said first data class.

14. The method of claim 11, wherein identifying as salient comprises selecting a first set of N consecutive unique features from said ranked list of unique features.

15. The method of claim 1, wherein identifying as salient comprises selecting a last M consecutive unique features from said ranked list of unique features.

16. An apparatus for classifying one or more electronic documents, said apparatus comprising:
a storage medium having stored therein a plurality of programming instructions designed to implement a plurality of functions of a category name service for providing a category name to a data object, including first one or more functions to
extract one or more unique features from a first content group of data objects representing a first group of electronic documents to form a first feature list,
extract one or more unique features from a second anti-content group of data objects representing a second group of electronic documents to form a second feature list,
identify those unique features of said first feature list that are not present in said second feature list,
identify those unique features of said first feature list that are also present in said second feature list,
create a ranked list of features by applying statistical differentiation between unique features of said first feature list and unique features of said second feature list, wherein those unique features of said first feature list that are not present in said second feature list are ranked higher within said ranked list as compared to those unique features of said first feature list that are also present in said second feature list,
identify a set of salient features from said ranked list of features, wherein said set of salient features distinguishes the first group of electronic documents from the second group of electronic documents, and
classify the first group of electronic documents and the second group of electronic documents based on the set of salient features.

17. The apparatus of claim 16, wherein each of said first content group of data objects and said second anti-content group of data objects comprises one or more data objects.

18. The apparatus of claim 16, wherein said plurality of instructions further comprises instructions to
determine a first total number of data objects comprising said first content group of data objects, and
determine a second total number of data objects comprising said second anti-content group of data objects.

19. The apparatus of claim 16, wherein said plurality of instructions further comprises instructions to
determine, for each of said one or more unique features forming said first feature list, a first number of data objects of said first content group of data objects that contain at least one instance of each respective said one or more unique features of said first feature list, and
determine, for each of said one or more unique features forming said second feature list, a second number of data objects of said second anti-content group of data objects that contain at least one instance of each respective said one or more unique features of said second feature list.

20. The apparatus of claim 17, wherein said plurality of instructions further comprises instructions to
apply a probabilistic function to each of those unique features of said first feature list that are also present in said second feature list to obtain a result vector, wherein said probabilistic function comprises a ratio of the first number of data objects divided by said first total number of data objects, to said second number of documents divided by said second total number of data objects, and
order those unique features of said first feature list that are also present in said second feature list within said ranked list based at least in part upon the result vector of said probabilistic function.

21. The apparatus of claim 17, wherein those unique features of said first feature list that are not present in said second feature list are further ranked based upon the first number of data objects.

22. The apparatus of claim 16, wherein said plurality of instructions to identify said set of salient features from said ranked list of features further comprises instructions to select a first N contiguous features of said ranked list of features.

23. The apparatus of claim 16, wherein said plurality of instructions to identify said set of salient features from said ranked list of features further comprises instructions to select a last M contiguous features of said ranked list of features.

24. The apparatus of claim 16, wherein each of said unique features comprises a grouping of one or more alphanumeric characters.

25. The apparatus of claim 16, wherein said plurality of instructions further comprises instructions to classify a new data object as being most related to one of said first content group of data objects and said second anti-content group of data objects based at least in part upon said set of salient features.

26. The apparatus of claim 16, wherein said first content group of data objects comprises those data objects corresponding to a selected node of a subject hierarchy having a plurality of nodes and any associated sub-nodes of the selected node; and wherein said second anti-content group of data objects comprises those data objects corresponding to any associated sibling nodes of the selected node and any associated sub-nodes of the sibling nodes.

27. An apparatus comprising:

a storage medium having stored therein a plurality of programming instructions designed to implement a plurality of functions including first one or more functions to identify one or more unique features that are members of a first data class, said first data class comprising a first group of electronic documents, examine a second data class to identify those of said one or more unique features that are also members of said second data class, and those of said one or more unique features that are not members of said second data class, said second data class comprising a second group of electronic documents, generate a ranked list of unique features having an order based upon membership of each of said one or more unique features within said second data class, wherein those of said unique features that are not members of said second data class are ranked higher in said ranked list than those of said unique features that are also members of said second data class, and identify as salient one or more of said ranked list of unique features, wherein said salient distinguishes the first group of electronic documents from the second group of electronic documents, and classify the first group of electronic documents and the second group of electronic documents based on the set of salient features.

28. The apparatus of claim 27, wherein said plurality of instructions further comprises instructions to determine, for each of said ranked list of unique features, a number of objects within said first data class that contain each respective unique feature.

29. The apparatus of claim 28, wherein said plurality of instructions to generate a ranked list further comprises instructions to rank those of said unique features that belong to a greater number of objects of said first data class higher in said ranked list than those of said unique features that belong to a lesser number of objects within said first data class.

30. The apparatus of claim 27, wherein said plurality of instructions to identify as salient further comprises instructions to select a first set of N consecutive unique features from said ranked list of unique features.

31. The apparatus of claim 27, wherein said plurality of instructions to identify as salient further comprises instructions to select a last set of M consecutive unique features from said ranked list of unique features.

* * * * *